Oct. 10, 1939.                 E. STEINERT                 2,175,928
                              WELDING SYSTEM
                        Original Filed March 12, 1936
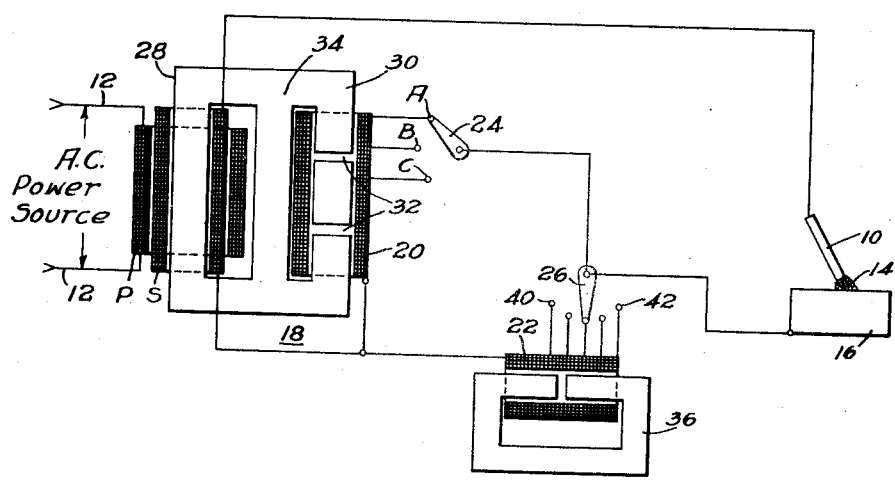
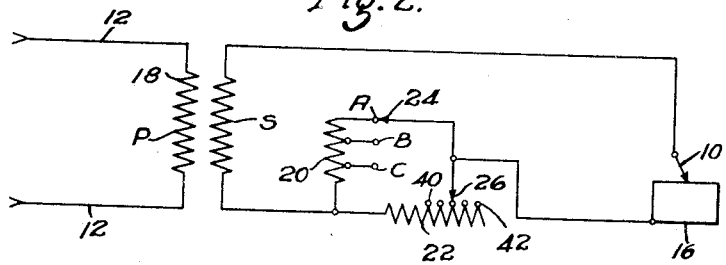
WITNESSES:                                          INVENTOR
                                                  Emil Steinert.
                                                  BY
                                                     ATTORNEY Patented Oct. 10, 1939

2,175,928

UNITED STATES PATENT OFFICE 2,175,928

WELDING SYSTEM

Emil Steinert, Sharon, Pa., assignor to Westinghouse Electric & Manufacturing Company, East Pittsburgh, Pa., a corporation of Pennsylvania Original application March 12, 1936, Serial No. 68,439. Divided and this application May 14, 1937, Serial No. 142,570

4 Claims. (Cl. 171—119)

My invention relates to alternating-current welding systems, and it has particular relation to systems which utilize a transformer and other apparatus to maintain the welding current within given limits and to adjust the current range which said limits define.

This application is a division of my copending application, Serial No. 68,439, relating to an improvement in welding transformers, filed March 12, 1936, and assigned to the same assignee as this application.

Generally stated, the object of my invention is to lighten the weight, reduce the size and otherwise improve induction-type apparatus suitable for the above service.

A more specific object is to reduce the losses and minimize the stray magnetic fields which are incident to such apparatus.

Another object is to combine into a single unit the energy-supply transformer and the main regulating reactor.

A still further object is to provide an improved current-adjusting scheme which affords steps of equal increments over the entire welding range.

My invention, together with additional objects and advantages, will best be understood from the following description of a specific embodiment when taken in conjunction with the accompanying drawing, in which Figure 1 is a diagrammatic representation of apparatus and circuits illustrating welding-current supply equipment incorporating the several improved features of my invention, and Fig. 2 is a winding-development diagram of the equipment of Fig. 1.

Referring to the drawing, I have there illustrated a welding electrode 10 adapted to be supplied from an alternating-current power source 12 with current suitable to sustain an arc 14 (shown in Fig. 1 only) between the end of the electrode and the metal or other work 16 upon which a weld is to be made.

Included in the supply circuit is a transformer 18 which, by means of primary and secondary windings P and S, respectively, lowers the voltage and raises the current of the energy supplied to the electrode, and performs the further function of electrically insulating the electrode 10 and the work 16 from the higher voltage supply circuit 12. The transformer unit also includes a regulating reactor winding 20 that is connected in the electrode circuit in parallel circuit relation to a reactor winding 22, adapted to keep the welding current within given limits as the length of the arc 14 may be varied by shifting the electrode position. Switches 24 and 26 associated with tapped connections from these windings serve to change the current setting as differences in the character or type of the work 16 and the size of the electrode 10 may make desirable.

In accordance with my invention, I employ a single energy-supply transformer unit 18 having a three-legged core structure. On one of the outer legs 28 the primary and secondary windings P and S, respectively, are carried, and on the other outer leg 30 the main regulating reactor winding 20 is supported in a manner that it completely encloses one or more air gaps 32 with which this leg is preferably provided. The central leg 34 of the structure is common to the magnetic circuits defined by the two outer legs.

It will be noted that the current supplied to electrode 10 from the secondary winding S divides itself between the main reactor winding 20 and the winding 22 of an auxiliary reactor which is associated with a magnetic core 36. The effect of the reactor windings 20 and 22 is to maintain the current in the welding circuit within given limits, regardless of the length and character of the arc 14. This approach to constant current results from the fact that impedance of the circuit through which power source 12 supplies the welding current is comparatively high as compared with the range of impedance variation of the arc 14.

In order to raise the current setting of the equipment, the switch 24 may be moved downwardly from the stationary contact A, representing the lowest current setting, to contact B, which corresponds to an intermediate value of current, and thence to contact C, which affords the highest range of current values. Within each of these ranges still finer adjustment may be effected by shifting the position of switch 26 along the taps of auxiliary winding 22. Advancement to the left to tap 40 effects an increase in current, while movement to the right or tap 42 lowers the current.

Current steps of nearly equal increments over the entire welding range are afforded by means of the parallel reactor arrangement shown. This represents a distinct advantage over prior art arrangements which give equal percent increments resulting in too fine an adjustment at the lower end of the range, and too coarse an adjustment at the upper end.

The combining of the main transformer and the main reactor 20 into a single unit results in an appreciable reduction in the weight of the equipment and renders this major portion of the welding system equipment much more compact. Because the central core leg 34 is a part of the magnetic circuits of both of the two outer legs 28 and 30, a very economical use of core material is achieved, which further is enhanced by comparatively balanced magnetomotive forces in the structure during operation.

By mounting the main reactance winding 20 around the core leg 30 in a manner that it completely encloses the one or more air gaps 32, the possibility of high stray magnetic leakage fields is largely eliminated. This not only reduces power losses but also permits the use of a small compact metal housing (not shown) around the equipment.

While in practice the alternating-current arc welder just described is, for design reasons, best adapted to the smaller current ratings (in the neighborhood of 100 amperes), it will, of course, be understood that the scheme is not exclusively so limited but may with satisfaction also be applied to the higher current ratings. In the system illustrated, taps A, B and C may, for example, provide for high, medium and low settings of 150, 100 and 50 amperes, while the taps associated with auxiliary winding 22 may sub-divide each of these major current ranges into five equal divisions.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. An adjustable-impedance transformer comprising a magnetic core structure having three legs connected at their ends by two solid yokes, energy-transfer windings carried by one of the two outer legs of the structure, an air gap in the other outer leg and an auxiliary winding thereon surrounding the air gap, said auxiliary winding being connected in the transformer output circuit to hold the output current within predetermined limits, and means for adjusting the portion of said winding which carries said current to alter the magnitude of said limits.

2. An adjustable-impedance transformer comprising a core structure having a plurality of legs all connected at their ends by two solid yokes, one of said core legs being provided with a plurality of air gaps, a current limiting winding on said leg surrounding said air gaps, closely coupled power translating primary and secondary windings on another of said legs, said current limiting winding being connected in series circuit relation with said secondary winding and provided with tap connections for varying the effective number of turns in the secondary winding circuit.

3. In a transformer, a magnetic core structure having three leg members all connected at their ends by two solid yoke members, a primary and secondary winding on one leg, another of said legs having an air gap therein and a winding thereon completely enclosing the gap and connected in series circuit relation with the secondary winding to carry a measure of the transformer output current.

4. In a transformer, a magnetic core structure having three leg members all connected at their ends by two solid yoke members, a primary and secondary winding on one leg, another of said legs having an air gap therein and a winding thereon completely enclosing the gap and connected in series circuit relation with the secondary winding for limiting the secondary current to a predetermined value, and means for adjusting the effective number of turns of the last named winding to adjust the limiting value.

EMIL STEINERT.